United States Patent Office 3,349,152
Patented Oct. 24, 1967

3,349,152
METHOD OF PRODUCING A SINTERED URANIUM DIOXIDE NUCLEAR FUEL ELEMENT CONTAINING A BORIDE
Takaaki Watanabe and Tadashi Ogura, Urawa, and Yoshiaki Kondo and Masaji Nagasawa, Ohmiya, Japan, assignors to Mitsubishi Atomic Power Industries, Inc., Tokyo, Japan, a corporation of Japan
Filed Mar. 6, 1965, Ser. No. 440,121
Claims priority, application Japan, Mar. 19, 1964, 39/15,044
2 Claims. (Cl. 264—.5)

This invention relates to a method of producing sintered composite ceramic nuclear fuel elements having added thereto a boride.

To the conventional type of ceramic nuclear fuel elements comprising uranium dioxide alone, composite ceramic nuclear fuel elements having added thereto a boride as a burnable poison are superior in that the composite elements cannot only control the initial reactivity at the beginning of the operation of nuclear reactors for power purpose, but also permit their useful life to increase. In addition, the use of such composite fuel elements results in the evenness of neutron flux and in the simplification of design for control rods. Nevertheless the composite ceramic nuclear fuel elements could not be realized up to now for various difficulties encountered in the production thereof.

For example, upon producing a composite ceramic nuclear fuel element according to the prior art practice, a part of boride added in a small amount to a raw material for the element is decomposed into boric acid anhydride and an oxide of an element which has been compounded with boron to provide a boride while a part of the boride is vaporized as boric acid during the producing process. This results in large fluctuations of boron content in the finished nuclear fuel element which is undesirable. Also with a large amount of carbon and the incidental nitrogen present in the nuclear fuel element, the latter cannot have a high density and unburned cores are formed on the central portion of the fuel element resulting in a multiplicity of minute cracks being formed on its surface. If such nuclear fuel elements are used in a nuclear reactor a gas or gases will be evolved in large amount or amounts during operation to aid in increasing the pressures within the fuel elements. This brings about significant problems in view of the safety and maintenance of the fuel elements.

Therefore, it has been previously difficult to produce composite ceramic nuclear fuel elements having a stoichiometric composition, a high density and a high accuracy of dimension wherein fluctuations of boron content are maintained within extremely narrow tolerance limits while only an exact amount of a boride added to the element material is uniformly dispersed into the finished element without carbon, nitrogen, oxygen, etc., which are inevitably mixed with the fuel material during the production process left in the finished element.

The primary object of the invention is, accordingly, to provide a new and improved method of producing excellent composite nuclear fuel elements wherein the above-mentioned disadvantages are eliminated.

Another object of the invention is to provide a new and improved method of producing composite ceramic nuclear fuel elements each having a stoichiometric composition, a high density and a high accuracy of dimension wherein fluctuations of boron content are maintained within extremely narrow tolerance limits while only an exact amount of a boride added is uniformly dispersed into the finished element without carbon, nitrogen, oxygen, etc., which are inevitably mixed with the fuel material during the production process left in the finished element.

With the above cited objects in view, the invention resides in a method of producing sintered composite ceramic nuclear fuel elements having added thereto a boride, the method comprising the steps of forming a mixture of a finely divided ceramic nuclear fuel material having added thereto a finely divided boride and an organic forming agent of hydrocarbon system and a solvent of hydrocarbon system therefor into a formed member, maintaining the same formed member in a reducing atmosphere at a temperature in the vicinity of the boiling point of the organic forming agent for a predetermined period of time to remove the forming agent and to preliminarily sinter the formed member, exposing the preliminarily sintered member to an atmosphere of a vacuum without the same brought into air, and heating the member in the atmosphere of vacuum to a predetermined high temperature and maintaining the member at that temperature for a predetermined period of time whereby the principally sintering operation in the vacuum is performed consecutively and simultaneously with the preliminarily sintering operation.

The invention will become more readily apparent from the following detailed description taken in conjunction with the acompanying drawings in which.

Figure 1:
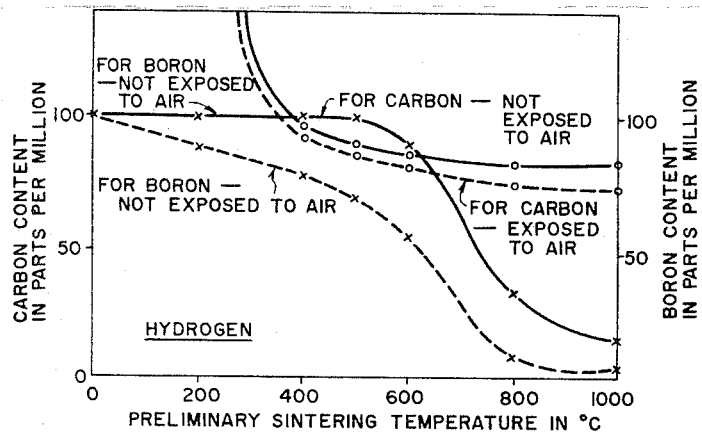
FIG. 1 is a graph illustrating the relationship between temperature at which a composite ceramic nuclear fuel material is preliminarily sintered in an atmosphere of hydrogen and carbon and boron contents in the resulting sintered member.

Heretofore, a method of producing sintered members of uranium dioxide which are ceramic nuclear fuel elements comprises generally the preliminarily sintering step in which a formed member of uranium dioxide produced by forming a finely divided uranium dioxide having added thereto an organic forming agent as a binding agent is treated in a reducing atmosphere such as hydrogen or carbon dioxide gas at from 600° to 1000° C. in order to remove the organic forming agent and the principally sintering step in which, after the preliminarily sintered member has been once brought into air, the same is heat treated in an atmosphere of hydrogen, an inert gas or a vacuum at from 1500° to 1700° C. to provide a sintered member. If a composite formed member comprised of a finely divided ceramic nuclear fuel material having added thereto a boride is heat treated under the conditions just described then almost all of the boride is decomposed into boric acid anhydride and an oxide formed by oxidation of an element which has been compounded with boron to form the boride. Therefore, for producing the sintered composite ceramic nuclear fuel element, it is necessary to heat treat the boride under the stable condition in its production process.

The following Table I indicates the stability of zirconium, titanium and molybdenum borides $ZrB_2$, $TiB_2$ and $MoB_2$ which are particularly suitable for use with the invention, as well as the sintering atmospheres and heat treating temperatures.

TABLE I.—STABILITY OF BORIDES

| Borides | Heat treating temperature | | | | | | | | | | | |
|---|---|---|---|---|---|---|---|---|---|---|---|---|
| | 500° C. | | | 900° C. | | | 1,300° C. | | | 1,700° C. | | |
| | $ZrB_2$ | $TiB_2$ | $MoB_2$ | $ZrB_2$ | $TiB_2$ | $MoB_2$ | $ZrB_2$ | $TiB_2$ | $MoB_2$ | $ZrB_2$ | $TiB_2$ | $MoB_2$ |
| Sintering atmosphere: Hydrogen at 5 l./min. | O | O | O | Δ | Δ | Δ | X | X | X | X | X | X |
| Carbon dioxide gas at 5 l./min. | Δ | Δ | Δ | X | X | X | X | X | X | X | X | X |
| Vacuum of at least $10^{-4}$ mm. Hg. | O | O | O | O | O | O | O | O | O | O | O | O |

Remark.—The symbol O means that the boride was stable; the symbol Δ means that the boride was partially decomposed due to its oxidation; the symbol X means that the boride was decomposed due to its oxidation.

From the above table it will be readily understood that the borides begin to be oxidized in an atmosphere of carbon dioxide gas at 500° C. or more, and in an atmosphere of hydrogen at 900° C. or more. In other words, the boride can be stable only in an atmosphere of a vacuum, and in an atmosphere of hydrogen at 500° C. or less.

The invention utilizes the stability of the borides as above described and contemplates to provide new requirements for heat treating sintered composite ceramic nuclear fuel members having added thereto the borides.

Upon producing sintered uranium dioxide members which provide ceramic nuclear fuel elements, an amount of finely divided uranium dioxide which is a starting material has generally added thereto a forming agent to produce formed members. The formed members are then subject to a preliminarily sintering treatment whereby the forming agent is removed from the preliminarily sintered members. As the forming agents there may be used polyvinyl alcohol, polyethylene glycol, methyl cellulose and the like for which water is used as their solvent; hydrocarbons such as paraffin, polybutene, polyisobutylene and the like soluble in solvents of hydrocarbon system but insoluble in water; oxygen containing hydrocarbons such as stearic acid etc.

Zirconium, titanium or molybdenum boride can be preferably used in practicing the invention.

In order to determine the type of forming agents particularly suitable for use in practicing the invention, the different forming agents as above described were respectively added to a raw material composed of a finely divided uranium dioxide providing a ceramic nuclear fuel material and a finely divided boride, for example, zirconium boride mixed therewith in a predetermined amount such as an amount of 100 parts per million in terms of boron content to provide formed members. The formed members then were sintered under the heat treatment requirements for maintaining zirconium boride stable during the heat treatment, for example, at a sintering temperature of 1600° C. in a vacuum. The resulting sintered members had the respective contents of boron as illustrated on the following Table II on which the type of the forming agents involved, their amounts added, the solvents therefor are also listed.

the forming agent and the solvent therefor partially oxidizes boron during that heat treatment process and partially vaporizes the boron as boric acid in the sintering step. Therefore, it is to be understood that, to produce sintered composite ceramic nuclear fuel elements with a boride added, it is required to use the forming agents and solvents of hydrocarbon system.

With the forming agents of hydrocarbon system used, carbon due to the same will be expected to be left in the resulting sintered member. It has been found that the amount of carbon left in the sintered member depends upon the type of the forming agent involved and the heat treatment requirements involved.

Figure 2:
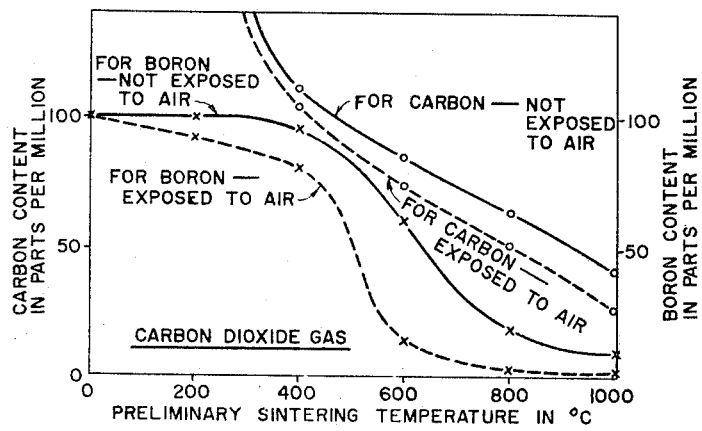
FIG. 2 is a graph similar to that of FIG. 1 but illustrating the case preliminarily sintering operation is performed in an atmosphere of carbon dioxide gas.
Figure 3:
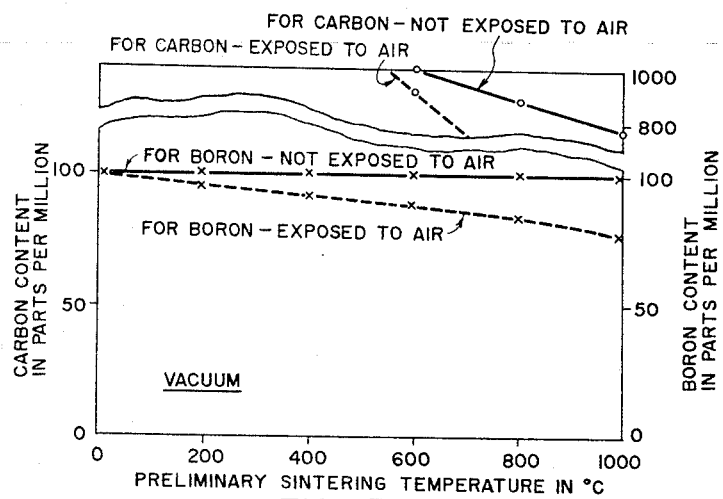
FIG. 3 is a graph similar to that of FIG. 1 but illustrating the case the preliminarily sintering operation is performed in an atmosphere of a vacuum.

The experiments were conducted with a mixture of finely divided uranium dioxide and finely divided zirconium boride whose content is 100 parts per million in terms of boron amount. By using a polybutene as the forming agent the mixture was compression formed under a pressure of 3 tons per square centimeter into formed members. The resulting formed members were treated under the various heat treatment requirements. The results of those experiments are illustrated in FIGS. 1 through 3.

In FIG. 1 solid curves depict the relationship between preliminarily sintering temperature and contents of carbon and boron in sintered member in terms of the formed members preliminarily sintered in an atmosphere of hydrogen and immediately sintered in a vacuum at 1600° C. for 2 hours without the preliminarily sintered member exposed to air before the sintering process whereas dotted curves depict such relationship in terms of the formed members preliminarily sintered in an atmosphere of hydrogen and sintered in a vacuum at 1600° C. for 2 hours after the preliminarily sintered members have been once exposed to air. The symbol O designates the carbon content measured and the symbol X the boron content measured. FIGS. 2 and 3 are views similar to FIG. 1 in conjunction with the preliminarily sintering atmosphere consisting of carbon dioxide gas and a vacuum respectively.

In order to ensure that only the exact amount of boron added is left in the resulting sintered member, it is undesirable to effect preliminary sintering in an atmosphere of carbon dioxide gas as will be apparent from Table I.

TABLE II.—FORMING AGENT AND BORON CONTENT IN SINTERED MEMBER

| Forming agent | Polyvinyl alcohol and polyethylene glycol | Methyl cellulose | Polybutene | Paraffin | Stearic acid |
|---|---|---|---|---|---|
| Added amount in percent by weight | 0.5, 0.5 | 1 | 1 | 1 | 1. |
| Solvent | Water | Water | Hexane | Carbon tetrachloride. | Benzene. |
| Boron content in parts per million | 85 | 80 | 101 | 98 | 90. |

From Table II it will be seen that the boron content in the sintered member was lower than the amount of boron added to the raw material except for the case the forming agents of hydrocarbon system and their solvents of hydrocarbon system were used. The reason for this is that oxygen contained in the form of compounds in both the forming agent and the solvent therefor partially oxidizes boron during that heat treatment process.

Also it is not preferable to effect heat treatment in an atmosphere of hydrogen at a temperature exceeding 500° C. as will be also understood from the Table I. FIGS. 1 and 2 clearly illustrate that the use of carbon dioxide gas and a vacuum at a temperature exceeding 500° C. is not objectionable.

As shown in FIG. 3, the preliminary sintering in a vacuum results not only a great amount of carbon left in the sintered member but also in an unsintered core portion being formed on the central part of the sintered member with its surface stained and having minute cracks formed thereon. In addition, the sintered member is not increased in density.

After the formed members as previously described in conjunction with FIGS. 1 through 3 were preliminarily sintered in an atmosphere of hydrogen at a temperature below 500° C. and in vacuum respectively and then once exposed to air followed by sintering in a vacuum, the resulting sintered members were chemically analysed in terms of boron content. The analysis indicated that the boron content in the sintered member is decreased than the amount of boron initially added by from 15 to 20%. The reason for this is that because the preliminarily sintered members were once brought into air uranium dioxide is partially oxidized whereby oxygen contributing to that oxidation affects adversely boron contained in the sintered member.

On the other hand, after the formed members have been preliminarily sintered in a vacuum and then intactly sintered in a vacuum without the preliminarily sintered member exposed to air before the sintering process, the resulting sintered members remain substantially unchanged in boron content as shown in FIG. 3. However, such sintered members greatly increase their carbon content and have minute cracks appearing on their surfaces. In addition, the density of the sintered member cannot be increased beyond a predetermined magnitude.

Figure 4:
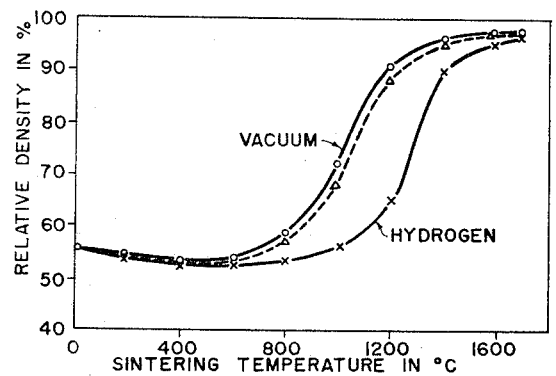
FIG. 4 is a graph illustrating the relationship between temperature at which composite ceramic nuclear fuel materials are sintered and density of sintered member.

Referring now to FIG. 4, there is illustrated curves plotting the sintered density in percent of sintered uranium dioxide nuclear fuel elements sintered in a vacuum and hydrogen respectively and including 100 parts per million or less of carbon against the sintering temperature. As seen in FIG. 4, the sintering process in a vacuum at a sintering temperature above approximately 600° C. result in the same sintered density provided by the sintering process in hydrogen at a temperature higher than the sintering temperature in the vacuum by from 100° to 300° C. As also shown at dotted curve in FIG. 4, the sintering process effected in hydrogen up to 500° C. and then in a vacuum at a temperature above 500° C. has a tendency approximately similar to that exhibited in the sintering process effected in a vacuum alone. The resulting ceramic nuclear fuel element sintered in a vacuum is low in an amount of hydrogen adsorbed therein as compared with the use of a sintering atmosphere including hydrogen. In addition, the vacuum sintering process not only permits the sintering temperature to lower as compared with the hydrogen sintering process in order to provide the same sintered density in both processes but also the vacuum sintered fuel element retains its physical and chemical properties remaining substantially unchanged between before and after the sintering process.

In the light of the foregoing and in accordance with the teachings of the invention, a sintered composite ceramic nuclear fuel element having added thereto a boride is produced by the steps of adding a mixture of a finely divided ceramic nuclear fuel material, for example, finely divided uranium dioxide and a finely divided boride such as zirconium boride an organic forming agent of hydrocarbon system, for example, polybutene and a solvent therefor, such as hexane, forming the resulting mixture into a formed member, putting the formed member into a reducing furnace to maintain the same in a stream of a reducing atmosphere such as hydrogen at a temperature in the vicinity of the boiling point of the organic forming agent to completely remove the forming agent from the formed member thus treated, substantially changing the atmosphere in the furnace from the reducing gas to a vacuum without the treated member brought into air and increasing the temperature of the furnace to a predetermined magnitude to sinter the member.

The following examples illustrate, by way of example, the practice of the invention.

Example I

A ceramic nuclear fuel material used was finely divided uranium dioxide $UO_2$ for use with a nuclear reactor having an apparent density of 3.1 g./cc., a taped density of 4.3 g./cc., an average diameter of particles of 1.8 microns, a ratio of oxygen to uranium O/U of 2.05 and a boride used was a finely divided zirconium boron $ZrB_2$ of stoichiometric composition having an average diameter of particles of 100 microns. The powder of uranium dioxide and the powder of zirconium boride were weighed so as to provide a mixture including a boron content of 100 parts per million. The weighed amounts of uranium dioxide and zirconium boride were mixed with each other and then thoroughly mixed in any suitable mixer. Placed in any suitable agitator were the resulting mixed powder and a forming agent, polybutene premilinarily weighed at 10% based upon the weight of the mixed powder and dissolved in hexane. After the mixed powder and the forming agent dissolved in hexane have been wet-stirred, the stirred material was granulated having a grain size of from −20 to +50 meshes. The grains thus formed were pressed under a pressure of 3 tons/cm.$^2$ within a forming die to provide a formed member.

The formed member was put in a molybdenum crucible and then placed in a sintering furnace having an atmosphere capable of changing from hydrogen to a vacuum. Under these circumstances, the furnace was first maintained at room temperature and exhausted to a vacuum of $10^{-5}$ mm. Hg. Then purified hydrogen is introduced into the exhausted furnace.

After the completion of hydrogen substitution, a stream of purified hydrogen was circulated at a flow rate of 10 l./min. through the furnace while increasing the temperature within the furnace from room temperature tn a temperature of 350° C. for 4 hours. Thereafter the furnace was maintained at a temperature of 400° to 450° C. for a period of time exceeding 10 hours.

Then the atmosphere in the furnace was changed from hydrogen to a vacuum of $10^{-4}$ or less. The furnace increased its temperature to 1500° C. while the vacuum was controlled so as not to decrease below $10^{-4}$ mm. Hg. The furnace was then maintained at the temperature of 1500° C. for 2 hours after which the same was allowed to be slowly cooled. After the temperature in the furnace has reached a temperature below 200° C., a stream of purified hydrogen was circulated at a flow rate of 10 l./min. through the furnace while the furnace was allowed to be cooled to room temperature. After having been cooled the member thus treated was taken out from the furnace to complete all the steps of the present method.

The sintered member treated in the manner as above described was determined to have a density exceeding 95% of its theoretical value and a ratio of oxygen to uranium of 2.00 with the surface being black and glossy and free from any crack. The chemical analysis indicated that a boron content was 100±5 parts per million and contents of carbon, nitrogen and hydrogen were equal to or less than 100, 25 and 25 parts per million respectively. The microscopic observation, the analysis with an X-ray-microanalyser and the like collectively proved that zirconium boride had its composition, proportion and particle size not at all different from the original ones.

Example II

The procedure effected in Example I was repeated except for a uranium dioxide powder derived from uranium hexafluoride $UF_6$ and having an apparent density of 2.8 g./cc., a taped density of 4.2 g./cc., an average diameter of particles of 1.6 microns, a ratio of oxygen to uranium of 2.05 and a relative surface area of particle BET of 0.76 m.$^2$/g. and a titanium boride powder having a stoichiometric composition, an apparent density of 0.7 g./cc., a taped of 1.5 g./cc. and an average diameter of particles of 4.7 microns.

The resulting sintered member had a high density reaching 96% of its theoretical value, and the ratio of oxygen to uranium of 2.00. Its surface was black and glossy and free from any crack. The chemical analysis indicated a boron content being 100±8 parts per million and contents of carbon, nitrogen and hydrogen being equal to or less than 100, 25 and 25 parts per million. Further, titanium boride contained in the sintered member had its composition, proportion and particle size not at all different from the original ones.

*Example III*

The procedure effected in Example I was repeated except for a powder of ceramic grade uranium dioxide having an apparent density of 3.2 g./cc., a taped density of 4.3 g./cc., an average diameter of particles of 0.8 micron, a ratio of oxygen to uranium of 2.06, and a relative surface area of particle of 1.36 m.$^2$/g., and a powder of molybdenum boride having a stoichiometric composition and an average particle size of 50 microns.

The resulting sintered member had a high density reaching 96% of its theoretical value, and the ratio of oxygen to uranium of 2.00. Its surface was black and glossy and free from any crack. The chemical analysis indicated a boron content being 100±5 parts per million and contents of carbon, nitrogen and hydrogen being equal to or less than 100, 25 and 25 parts per million respectively. Further, molybdenum boride contained in the sintered member had its composition, proportion and particle size not at all different from the original ones.

From the foregoing it will be appreciated that the addition of the organic forming agent of hydrocarbon system and its solvent of hydrocarbon system to the mixture of powdered uranium dioxide and powdered boride ensures that, upon removing the forming agent from the formed member through the heat treatment process, oxygen initially contained in the forming agent or evolved due to the decomposition thereof is effectively prevented from oxidizing the boride and uranium dioxide.

As previously described, the formed member is maintained in a reducing atmosphere at a temperature in the vicinity of the boiling point of the forming agent for a predetermined period of time. This ensures that any forming agent such as polybutenes capable of being easily subject to thermal decomposition, is converted to corresponding lower molecular compound or the corresponding mono-molecular compound capable of rapidly gasifying. Therefore, such converted compound will almost entirely escape leaving carbon in an amount of at most 100 parts per million in the resulting sintered member. If any forming agent of hydrocarbon system such as paraffin hardly heat decomposable is used, the same is heated to be gasified thereby to gradually leave the formed member.

According to the method of the invention, the preliminarily sintered member is exposed to a vacuum immediately after the preliminarily sintering process without the same brought into air and is subject to the principally sintering treatment. This prevents the preliminarily sintered member from oxidizing with oxygen in air into which the member would otherwise be brought and permits the member to be sintered without the boride involved being prevented from oxidizing with oxygen in a very small amount in the reducing atmosphere at a temperature above 500° C. In addition, the principally sintering process effected in a vacuum serves to promote in increasing densification of uranium dioxide member. For example, in order to provide a sintered member having a density reaching 95% of its theoretical value, principally sintering operation in a vacuum is sufficient to be performed at a temperature of at most 1400° C. whereas the principally sintering operation in an atmosphere of hydrogen is required to be performed at a temperature of at least 1500° C. Thus the use of the principally sintering process in a vacuum permits the sintering temperature for uranium dioxide to decrease as compared with the principally sintering process in an atmosphere of hydrogen.

Also, since the use of a vacuum results in a ratio of oxygen to uranium of 2.00, an amount of gas adsorbed in the sintered member greatly decreases as compared with the principally sintering process in an atmosphere of hydrogen.

In general, the borides are relatively low in vapor pressure, and hence may be scarcely vaporized at a temperature on the order of the sintering temperature for uranium dioxide or 1700° C. or less with the result that the boride involved is not appreciably lost.

While the invention has been described in conjunction with the preferred embodiments thereof it is to be understood that various changes and modification may be made without departing from the spirit and scope of the invention.

What we claim is:

1. A method of producing sintered composite nuclear fuel elements comprising forming a mixture of uranium dioxide and a boride selected from the group consisting of zirconium boride, titanium boride and molybdenum boride and an organic forming agent selected from the group consisting of paraffin, polybutene and polyisobutylene and a hydrocarbon solvent for the forming agent into a member, maintaining the member in an atmosphere of hydrogen at a temperature of about the boiling point of the forming agent for more than 10 hours to remove the forming agent and to preliminarily sinter the member, exposing the preliminarily sintered member to a vacuum having an absolute pressure no greater than $10^{-4}$ mm. Hg without exposing the preliminarily sintered member to air, heating the preliminarily sintered member in the vacuum to a temperature above 1300° C. and maintaining the member at that temperature for a time sufficient to complete the sintering.

2. A method according to claim 1, in which the time in which the member is maintained at a temperature above 1300° C. is 2 hours.

References Cited

UNITED STATES PATENTS 3,051,566   7/1962   Schwartz _____ 264—.5

OTHER REFERENCES

"Material and Fuels for High Temperature Nuclear Energy Applications," Cambridge, Mass., The M.I.T. Press, 1964; pp. 314–328 (NSA–22519, vol. 18. No. 3).

CARL D. QUARFORTH, *Primary Examiner.*

BENJAMIN R. PADGETT, *Examiner.*

S. J. LECHERT, JR., *Assistant Examiner.*